United States Patent [19]

Wykhuis

[11] Patent Number: 4,896,489
[45] Date of Patent: Jan. 30, 1990

[54] IMPLEMENT LIFT AND FLOTATION SYSTEM WITH A SINGLE TRANSVERSELY ADJUSTABLE CYLINDER

[75] Inventor: Lloyd A. Wykhuis, Mayville, Wis.
[73] Assignee: Deere & Company, Moline, Ill.
[21] Appl. No.: 327,280
[22] Filed: Mar. 22, 1989
[51] Int. Cl.[4] ............... A01D 34/04; A01D 63/108
[52] U.S. Cl. ................... 56/15.9; 172/810; 172/479
[58] Field of Search ............ 172/479, 443, 810, 439, 172/817, 491, 464; 56/14.9, 15.7, 15.8, 15.9, 229

[56] References Cited

U.S. PATENT DOCUMENTS

| | | | |
|---|---|---|---|
| 2,210,907 | 8/1940 | Erickson | 172/464 X |
| 2,658,438 | 11/1953 | Seng | 172/464 X |
| 3,031,175 | 4/1962 | Wooldridge | 172/464 |
| 4,307,561 | 12/1981 | Hicks | 56/15.9 |
| 4,487,268 | 12/1984 | Greve | 172/491 |
| 4,747,257 | 5/1988 | Hutchinson | 56/15.8 |
| 4,760,686 | 8/1988 | Samejima | 56/15.8 |

Primary Examiner—Richard J. Johnson

[57] ABSTRACT

An implement lift system for a machine such as a front mouted mower having a pair of transversely spaced lift arms operable by a single life cylinder. The lift cylinder is transversely adjustable utilizing a special cylinder bracket arrangement and a transverse member extending between bend locations on the lift arms forwardly of the pivotal connections of the lift arms with the vehicle. The transverse member is connected to provide lift to both arms from the single cylinder while permitting independent vertical movement of each of the arms. Compensation for unequal forces acting on the lift arms can be provided by moving the cylinder laterally to achieve even lift and flotation characteristics.

20 Claims, 2 Drawing Sheets

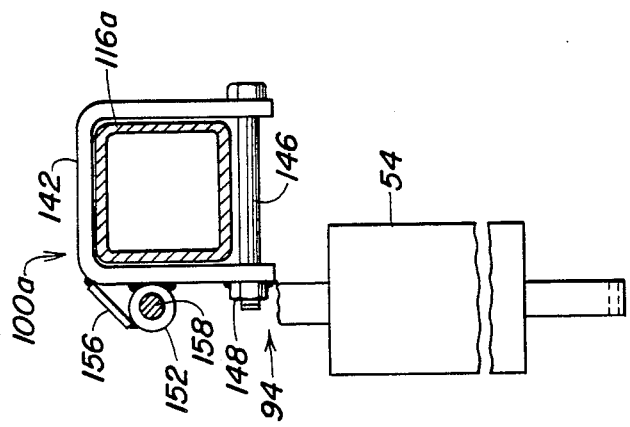
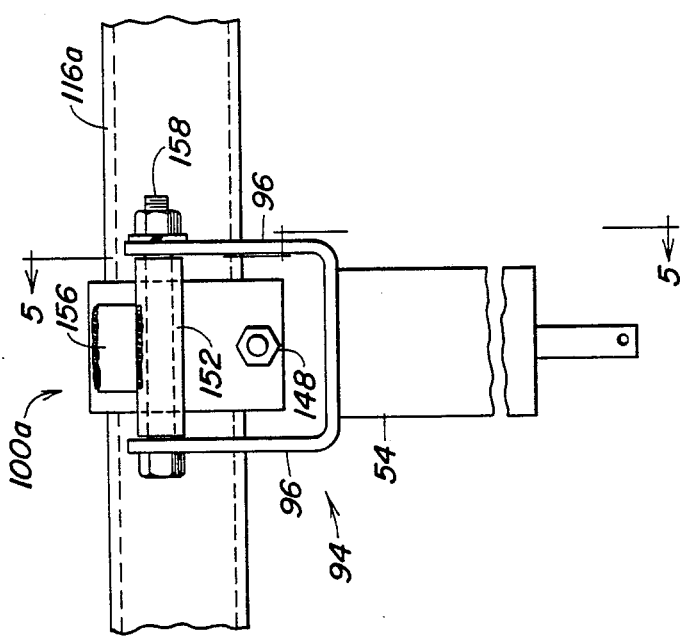

IMPLEMENT LIFT AND FLOTATION SYSTEM WITH A SINGLE TRANSVERSELY ADJUSTABLE CYLINDER

BACKGROUND OF THE INVENTION

The present invention relates generally to lift systems for implements, and more specifically, to a lift system having a pair of lift arms connected between a vehicle and an implement with a lift cylinder connected to the arms.

Various types of machines, such as a front mounted mower, utilize a pair of lift arms pivotally connected to a vehicle and extending forwardly therefrom to pivotal connections with an implement such as a mower deck. Various combinations of cylinder and lift linkages have been available to raise and lower the lift arms and to permit the implement to follow ground contours. One type of system available on the John Deere Model F910 front mounted mower includes a pair of cylinders, one cylinder connected to each lift arm with the cylinders being connected in parallel. The two cylinders not only increase the cost and complexity of the hydraulic system, but any unequal distribution in weight on the lift arms results in one of the arms raising before the other one when the implement is lifted toward the transport position. The arm carrying the most weight will also be the first to lower to the working position.

Although various systems have been devised which utilize a single lift cylinder, most of these systems suffer from one or more disadvantages. Some systems utilizing a single cylinder fix the lift arms for movement together or otherwise severely limit the independent vertical action of the arms thereby limiting the ground contour following ability of the implement. Other systems utilize a single cylinder and a lift arm arrangement connected to a pair of chains which are in turn connected to the lift arms. Mechanical linkages such as chains or the like are also relatively bulky and unsightly. In short, most single cylinder lift arrangements have not been able to effectively provide a combination of level lift, good contour following ability, and a good flotation function in a compact and sightly package.

BRIEF SUMMARY OF THE INVENTION

It is therefore an object of the present invention to provide an improved implement lift system which overcomes the aforementioned problems. It is yet another object to provide such a system which utilizes a single lift cylinder.

It is a further object of the present invention to provide an improved implement lift system having a pair of lift arms and utilizing a single hydraulic cylinder to raise and lower the lift arms generally in unison while still providing independent arm action to permit the implement to follow ground contours easily. It is another object to provide such a system which is adjustable for raising and lowering the lift arms generally in unison, even when implement weight is not uniformly distributed to the individual lift arms.

It is another object of the present invention to provide an improved implement lift system which utilizes a single lift cylinder and which is relatively compact and inexpensive to manufacture while still facilitating individual lift arm action and a good flotation function utilizing the cylinder during operation.

In accordance with the above objects, a machine with a front mounted mower includes a pair of lift arms extending forwardly from pivotal connections with the vehicle to forward pivotal connections with the implement. A transversely extending member is connected between the lift arms forwardly of the pivotal connections of the arms with the vehicle. A structural frame member on the vehicle located above the arms is slotted to receive a cylinder bracket which is transversely adjustable with respect to the frame member. The bracket pivotally supports the base end of a lift cylinder which extends downwardly from the bracket and includes a rod end pivotally connected by a ball joint and bolt arrangement to the transverse member. The cylinder is adjusted transversely with respect to the frame member and the bolt is positioned in one of a plurality of apertures in the transverse member to adjust the forces acting on the lift arms to accommodate unequal weight distribution of the implement on the arms. For example, if the left arm is carrying more weight than the right arm, the cylinder bracket may be repositioned relative to the frame member and the bolt repositioned in an aperture closer to the left arm to provide more lift to the left arm than to the right. Once the proper adjustment is found for a given implement weight distribution, the ball joint is secured to the transverse member. Thereafter, both sides of the implement will be raised and lowered approximately in unison. Also, independent lift suspension can be maintained with this design so that the implement easily follows ground contours during operation and so that a hydraulic flotation function utilizing the cylinder may be provided to transfer some of the weight of the implement to the vehicle. Good flotation characteristics are provided from a single cylinder since the proper adjustment of the cylinder provides relatively even lift forces on the arms during operation in the flotation mode. The arrangement of the cylinder between the vehicle frame and the lift arms is relatively compact and eliminates need for unsightly linkages or chains.

These and other objects, features and advantages of the present invention will become apparent to those skilled in the art from the description which follows and from the drawings.

BRIEF DESCRIPTION OF THE DRAWINGS

FIG. 4 is a fragmentary front view of an alternate embodiment of the cylinder connecting structure for the lift system.

FIG. 5 is a view taken essentially along line 5—5 of FIG. 4.

DESCRIPTION OF THE PREFERRED EMBODIMENT

Figure 1:
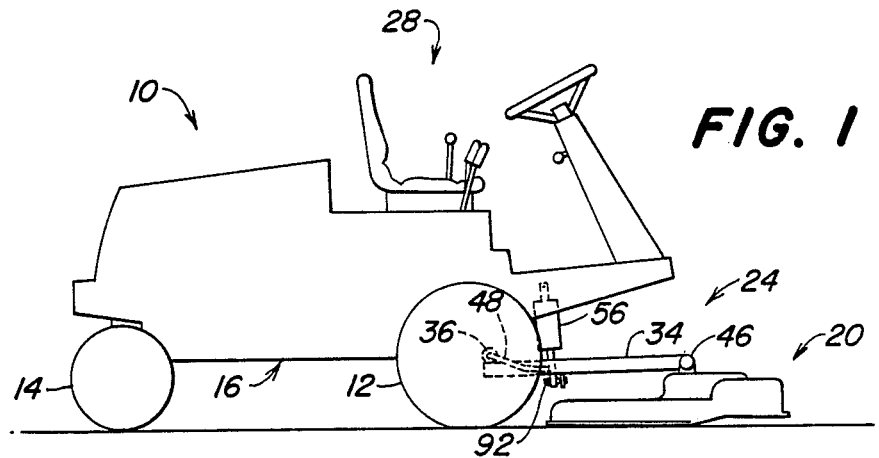
FIG. 1 is a side elevation of a front mounted mower with the implement lift system of the present invention attached thereto.

Referring to FIG. 1, there is shown a vehicle 10 having front drive wheels 12 and rear steerable wheels 14 supporting a frame 16 for forward movement over the ground. An implement 20 is supported forwardly of the vehicle 10 by a lift system indicated generally at 24. An operator station 28 with implement and vehicle controls is provided at the forward end of the vehicle 10.

The lift system 24 includes first and second transversely spaced lift arms 32 and 34 pivotally connected to the vehicle frame 16 at locations 36 adjacent the vehicle front axle for pivoting generally about a common transverse axis. The arms 32 and 34 extend forwardly from their pivotal connections at 36 to bend locations 42 and 44, respectively, wherein the arms diverge outwardly in the forward direction. The forward ends of the arms 32 and 34 are pivotally connected at locations 46 to the upper portion of transversely spaced locations on the implement 20, which as shown in FIG. 1 is a mower deck. A stabilizer bar 48 is connected between one of the pivot locations and the opposite arm. Depending on the type of implement 20 utilized with the vehicle 10, the center of gravity of the implement may vary so that the distribution of the implement weight on the individual lift arms 32 and 34 will vary and may not be equally distributed between the arms.

The implement lift system 24 includes a transversely adjustable lift cylinder 54 having a base end pivotally connected to the frame 16 of the vehicle 10 generally below the operator station 28 at the forward end of the vehicle. The rod end of the cylinder 54 is connected to a generally central location on a transverse bar member 56 which extends between the bend locations 42 and 44 on the lift arms 32 and 34, respectively. Angle brackets 62 and 64 connected adjacent the locations 42 and 44 by bolts 66 include inwardly directed flanges 72 and 74 having lower apertures which align with transversely extending slots 76 and 78 located in the opposite ends of the transverse member 56. Fasteners 82 and 84 extend through the slots 76 and 78 in the corresponding apertures in the member ends to position the transverse member 56 between the bend locations 42 and 44 on the arms 32 and 34. The slots 76 and 78 permit relative movement between the brackets (62, 64) and the corresponding ends of the bar 56 to accommodate independent vertical movement between the arms 32 and 34. The stabilizer bar 48 preferably is connected to one of the upper apertures in one of the angle brackets 62 or 64.

The transverse member 56 is apertured at locations 86 to receive a fastener pin 88 which extends through a ball swivel mount 92 connected to the lower end of the cylinder rod.

Figure 3:
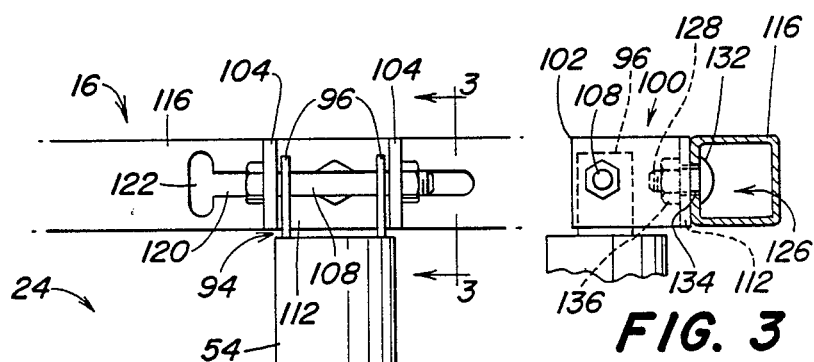
FIG. 3 is a side view taken essentially along line 3—3 of FIG. 2.
Figure 2:
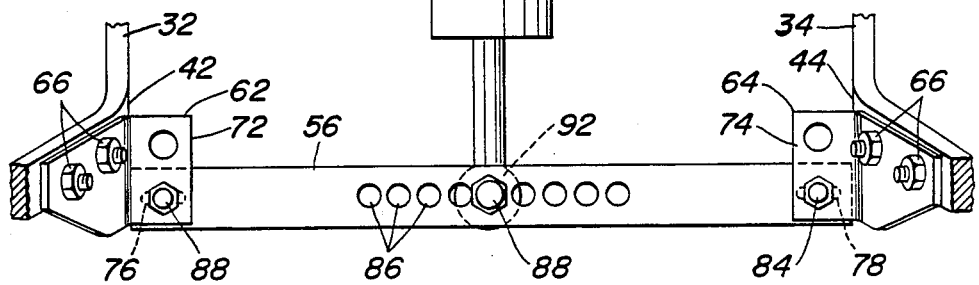
FIG. 2 is a fragmentary front view of a portion of the lift system showing the single transversely adjustable lift cylinder.

The cylinder 54 includes cylinder end connecting structure 94 having a pair of upwardly extending apertured ears 96 pivotally connected for rocking about a transversely extending axis to a transversely adjustable bracket arrangement indicated generally at 100. The bracket arrangement 100 as shown in FIGS. 2 and 3 includes a forwardly opening, U-shaped bracket 102 having forwardly projecting apertured ears 104 generally encompassing the ears 96 on the cylinder 54. A pivot pin 108 extending through the apertures in the ears 96 and 104 connects the cylinder 54 to the bracket 102 for rocking about the transversely extending axis. The bracket 102 includes a bight portion 112 which is connected to the front face of a transverse tubular beam 116 which forms a part of the forward vehicle frame 16. The tubular beam 116 includes a horizontally disposed slot 120 with an enlarged end 122. The U-shaped bracket 102 is slidably and rotatably mounted on the forward face of the tubular beam 116 by a bolt and bushing assembly 126. The assembly 126 includes a bolt 128 with a headed end 132 positioned in the slot 120 by way of the enlarged end 122. The bolt 128 extends through an aperture in the bight portion 112 of the bracket 102 and through a bushing 134. A nut 136 is threaded onto the end of the bolt 124 and is tightened against the bushing 134 to secure the bracket 102 in a preselected transverse location selected according to the weight distribution on the arms 32 and 34. The bracket 102 can pivot about the fore-and-aft extending axis of the bolt 128 to accommodate any vertical nonalignment between the upper and lower ends of the cylinder 54.

As shown in FIGS. 4 and 5, the adjustable bracket arrangement 100a includes a downwardly opening U-shaped bracket 142 slidably received over a tubular beam 116a and secured thereto by a bolt 146 threaded into a nut 148 welded to the lower front face of the bracket 142. A transverse pivot tube 152 is also welded to the front face above the nut 148. A strap 156 welded between the upper forward corner of the bracket 142 and the tube 152 provides additional support. The bolt 146 is tightened sufficiently to take slop out of the fit between the bracket 142 and the beam 116a while facilitating sliding of the bracket along the beam. The cylinder 54 is pivotally connected to the bracket by a pivot pin 158 extending transversely through the pivot tube 152 and through the apertures in the cylinder ears 96. The bracket 142 may be slid transversely on the beam 116a to align with the location of the selected aperture 861

The cylinder 54 is connected through hydraulic circuitry (not shown) controlled at the operator station 28 for retracting and extending of the cylinder 54 to raise and lower the lift arms 32 and 34. In addition, the hydraulic circuitry can include flotation circuitry for providing a preselected amount of lift from the cylinder 54 to transfer some of the weight of the implement 20 onto the front wheels 12 of the vehicle 10. For details of such a hydraulic lift and weight transfer device, reference may be had to co-pending application Ser. No. 07/324,364, of Michael C. Lee et al, entitled HYDRAULIC LIFT WITH WEIGHT TRANSFER, filed 15 Mar. 1989 and of common ownership with the present application.

In operation, assuming initially that the load on each arm 32 and 34 is approximately equal, the pin 88 is secured in position in the central aperture 86 of the transverse member 56, and the bracket 102 is secured directly above the aperture location. Retraction of the cylinder 54 raises the transverse member 56 and generally lifts each of the arms 32 and 34 in unison toward the raised transport position. Extending the cylinder 54 causes the transverse member 56 and the arms 32 and 34 to lower together. Once the implement 20 is in the lowered operating position as shown in FIG. 1, the slots 76 and 78 in the transverse member 56 permit independent vertical movement of the arms 32 and 34 so that the implement 20 can follow the ground contour. When flotation is provided by pressurizing the cylinder sufficiently to provide some lift without actually raising the implement 20 from the ground, the arrangement of the transverse member 56 assures that approximately equal weight transfer will occur through each of the arms 32 and 34. If the operator notices that the implement does not lift evenly and/or one side of the implement is being provided with more lift during the flotation function than another side, the operator may simply loosen the nut 136 on the bolt and bushing assembly 126 (with the embodiment of FIGS. 2 and 3) and remove the fastener 88 from the hole location on the transverse member 56 to move the cylinder 54 transversely as necessary to a different hole 86 location. For example, if the operator notices that the arm 32 is the last to lift and the first to lower during vertical movement of the arms 32 and 34, he can reposition the cylinder 54 closer to the arm 32 to provide more lift to the arm 32 and less lift to the arm 34 for more even lift characteristics. The ball swivel mount 92 on the rod end of the cylinder 54 is secured to the member 56 by positioning the fastener 88 through the desired aperture 86. The U-shaped bracket 102 is then slid transversely relative to the slot 120 until the cylinder 54 is in substantially an upright position when viewed from the forward direction. The nut 138 (FIGS. 2 and 3) is tightened on the assembly 126 to secure the bracket 102 in position. With the embodiment of FIGS. 4 and 5, the bracket 142 is slidably repositioned above the selected aperture 86. The swivel joint 92 at the end of the cylinder rod in combination with the pivotal connection of the cylinder end of the cylinder 54 with the bracket 102 or 142 provides a substantial degree of freedom of movement between the transverse member 56 and the implement frame 16. The slots 76 and 78 in the member 56 in combination with the fasteners 82 and 84 which accommodate relative movement between the slots and the corresponding brackets 72 and 74 permit the arms 32 and 34 to move vertically independently of each other. Therefore level lift, good contour following ability and good flotation characteristics are provided by the compact arrangement of the lift system 24 as described above.

Having described the preferred embodiment, it will be apparent that modifications can be made without departing from the scope of the invention as defined in the accompanying claims.

I claim:

1. In a vehicle having a frame and first and second transversely spaced lift arms pivotally connected to the frame and extending outwardly to distal connections with an implement, the weight of which is distributed in whole or part to the lift arms, a lift system comprising:
   an elongated lift member connected between the arms outwardly of the pivotal connections with the frame;
   a single hydraulic cylinder connected to the lift member and to the vehicle frame for providing a preselected vertical force to move the lift member vertically and to thereby raise and lower the lift arms; and
   means for adjusting the cylinder longitudinally relative to the lift member to distribute the preselected vertical force to the individual arms in proportion to the weight distribution of the implement on the lift arms.

2. The invention as set forth in claim 1 wherein the means for adjusting the cylinder longitudinally includes a first bracket adjustably connected to the frame for movement generally parallel to the lift member and supporting one end of the cylinder, and means for selectively connecting the opposite end of the cylinder at one of a number of locations along the length of the lift member.

3. The invention as set forth in claim 2 including means for pivotally connecting the cylinder to the first bracket for rocking about a first axis.

4. The invention as set forth in claim 2 including a slotted portion located on the vehicle frame and slidably mounting the first bracket.

5. The invention as set forth in claim 1 including means for connecting the opposite ends of the lift member to the lift arms to facilitate independent vertical movement of the arms relative to each other.

6. The invention as set forth in claim 5 including swivel joint means for connecting one end of the cylinder to the lift member.

7. The invention as set forth in claim 6 wherein the lift member comprises an apertured bar and the swivel joint means includes pin means selectively positionable in the apertured bar.

8. The invention as set forth in claim 5 wherein the lift arms diverge from preselected central arm locations toward the distal connections with the implement, and the means for connecting the opposite ends comprise brackets adjacent the central arm locations.

9. The invention as set forth in claim 8 including slotted connecting means associated with the lift member ends and brackets.

10. The invention as set forth in claim 6 including adjustable pivoting bracket structure for connecting the opposite end of the cylinder to the frame.

11. A lift system for an implement mounted at the forward end of a vehicle, comprising:
    first and second fore-and-aft extending lift arms;
    means pivotally connecting the aft ends of the lift arms to the vehicle for rocking vertically about a transverse axis;
    means connecting the implement to the forward ends of the lift arms for distributing the weight of the implement at least in part in given proportions at the respective forward ends of the arms;
    a single lift cylinder connected to the vehicle above the lift arms for providing a lift force;
    means for adjusting the cylinder transversely relative to the vehicle; and
    means operably connecting the lift cylinder to the first and second arms for adjustably distributing the lift force of the single cylinder relative to the forward ends of the respective arms, the lift force being adjustable with transverse adjustment of the cylinder to provide forces relative to the forward ends of the arms in generally like proportion to the weight distribution at the forward ends of the arms so that the arms are moved in unison upon operation of the lift cylinder.

12. A lift system for an implement mounted at the forward end of a vehicle, comprising:
    first and second fore-and-aft extending lift arms;
    means pivotally connecting the aft ends of the lift arms to the vehicle for rocking vertically about a transverse axis;
    means connecting the implement to the forward ends of the lift arms for distributing the weight of the implement at least in part in given proportions to the arms;
    a single lift cylinder connected to the vehicle above the lift arms for providing a lift force;
    means operably connecting the lift cylinder to the first and second arms for adjustably distributing the lift force of the single cylinder to the respective arms in generally like proportion to the weight distribution on the arms so that the arms are moved in unison upon operation of the lift cylinder; and
    wherein the means operably connecting includes a transverse member extending between the arms forwardly of the pivotal connections of the arms with the vehicle.

13. The invention as set forth in claim 12 wherein one end of the cylinder is selectively connectible at various locations along the transverse member.

14. The invention as set forth in claim 13 including means for transversely adjusting the location of the opposite end of the lift cylinder relative to the vehicle in accordance with the selected location along the transverse member.

15. The invention as set forth in claim 12 including means connecting the transverse member to the arms for facilitating independent vertical movement of the arms relative to each other.

16. The invention as set forth in claim 12 including a swivel joint connecting one end of the cylinder to the transverse member.

17. The invention as set forth in claim 16 including pivoting bracket structure connecting the opposite end of the cylinder to the vehicle.

18. The invention as set forth in claim 16 including means for slidably supporting the opposite end of the cylinder for transverse movement relative to the vehicle.

19. The invention as set forth in claim 16 including a bracket pivotally connected to the cylinder and to the vehicle for rocking about first and second generally perpendicular axes.

20. The invention as set forth in claim 18 wherein the means for slidably supporting the opposite end of the cylinder comprises a bracket pivotally connected to the cylinder and freely movable in the transverse direction relative to the vehicle.

* * * * *